US012650184B2

(12) United States Patent
Dasbach et al.

(10) Patent No.: US 12,650,184 B2
(45) Date of Patent: Jun. 9, 2026

(54) FITTING FOR CREATING A FLUID-TIGHT SCREW CONNECTION

(71) Applicant: Viega Technology GmbH & Co. KG, Attendorn (DE)

(72) Inventors: Philipp Dasbach, Wilnsdorf (DE); David Lindemann, Gummersbach (DE); Reiner Mester, Lennestadt (DE); Karsten Bohr, Attendorn (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 19/129,750

(22) PCT Filed: Nov. 10, 2023

(86) PCT No.: PCT/EP2023/081458
§ 371 (c)(1),
(2) Date: May 14, 2025

(87) PCT Pub. No.: WO2024/104911
PCT Pub. Date: May 23, 2024

(65) Prior Publication Data
US 2026/0009480 A1     Jan. 8, 2026

(30) Foreign Application Priority Data
Nov. 15, 2022     (DE) ..................... 10 2022 130 169.9

(51) Int. Cl.
*F16L 15/00*     (2006.01)

(52) U.S. Cl.
CPC .................................. *F16L 15/008* (2013.01)

(58) Field of Classification Search
CPC ....... F16L 13/14; F16L 13/141; F16L 13/142;
F16L 13/146; F16L 13/16; F16L 13/161;
F16L 13/168; F16L 13/147; F16L 15/008;
F16L 15/04; F16L 15/08
See application file for complete search history.

(56) References Cited

U.S. PATENT DOCUMENTS

| | | | | |
|---|---|---|---|---|
| 3,208,757 | A | * | 9/1965 | Jageman ............... F16L 13/161 |
| | | | | 277/944 |
| 4,527,820 | A | * | 7/1985 | Gibson ................. F16L 13/142 |
| | | | | 285/369 |
| 5,088,771 | A | * | 2/1992 | Hosseinian ........... F16L 13/146 |
| | | | | 285/39 |

(Continued)

FOREIGN PATENT DOCUMENTS

DE         102013108201 A1     2/2015

*Primary Examiner* — Aaron M Dunwoody
(74) *Attorney, Agent, or Firm* — The Webb Law Firm

(57)     ABSTRACT

The invention relates to a fitting for creating a fluid-tight screw connection for a pipe having an external thread, with a fitting base body, with a pressing sleeve connected to the fitting base body, with a chamber formed in the pressing sleeve, with an elastomer seal arranged in the chamber and with a plastic seal arranged in the pressing sleeve. The elastomer seal consists of a material with an elasticity which is greater than the elasticity of the material of the plastic seal, and wherein the plastic seal is in contact with the elastomer seal on the outside and has a thread on the inside for screwing onto the external thread of the tube.

8 Claims, 8 Drawing Sheets

(56)  References Cited

U.S. PATENT DOCUMENTS

| | | | | |
|---|---|---|---|---|
| 6,427,309 | B1 * | 8/2002 | Viegener | F16L 13/142 |
| | | | | 285/379 |
| 10,001,230 | B2 * | 6/2018 | Rischen | B21C 37/28 |
| 10,359,132 | B2 * | 7/2019 | Hartmann | F16L 13/147 |
| 2007/0128912 | A1 * | 6/2007 | Glaze | F16L 13/142 |
| | | | | 439/320 |
| 2011/0115219 | A1 * | 5/2011 | Biris | F16L 13/142 |
| | | | | 285/345 |
| 2012/0161438 | A1 * | 6/2012 | Rischen | F16L 13/142 |
| | | | | 285/382 |
| 2016/0238167 | A1 * | 8/2016 | Hartmann | B65G 39/125 |
| 2018/0313475 | A1 * | 11/2018 | Lawrence | F16K 41/16 |
| 2024/0337336 | A1 * | 10/2024 | Zhang | F16L 13/142 |

* cited by examiner

FITTING FOR CREATING A FLUID-TIGHT SCREW CONNECTION

CROSS-REFERENCE TO RELATED APPLICATIONS

This application is the United States national phase of International Patent Application No. PCT/EP2023/081458 filed Nov. 10, 2023, and claims priority to German Patent Application No. 10 2022 130 169.9 filed Nov. 15, 2022, the disclosures of which are hereby incorporated by reference in their entireties.

BACKGROUND OF THE INVENTION

Field of the Invention

The invention relates to a fitting for creating a fluid-tight screw connection for a pipe having an external thread, with a fitting base body, with a pressing sleeve connected to the fitting base body, with a chamber formed in the pressing sleeve and with a seal arranged in the chamber. Such a fitting may also be referred to as a threaded press-fit connector.

Description of Related Art

The technical field relevant to the present invention is the on-site installation of piping systems, in which a piping system consisting of pipe sections and fittings is generally installed for the routing and guiding of a fluid, i.e. a liquid or a gas. A fitting is generally understood to be a connecting piece for a pipe, and a fitting is most frequently used to connect two or more pipe sections. Accordingly, the fitting preferably has two or more press sections, for example in the form of pressing sleeves. The most common fittings include straight connections, direction changes in the form of pipe bends, reducers, branches such as T-pieces or crossings. However, a fitting also refers to a pipe connection for a faucet or other component. For example, thermometers or pressure gauges as faucets only have one connection for a pipe section. The fitting of a faucet therefore only has one press section to connect a pipe section to the fitting.

SUMMARY OF THE INVENTION

The piping systems generally described above are used in particular to transport drinking or heating water, gas for operating a heating system or industrial gases. In principle, any fluid medium can be transported in the piping.

Fittings are often designed as press connectors, in which the fitting and a pipe to be connected are joined by radial forming. In certain applications, such as connections with predetermined threads, fluid-tight screw connections are required as fittings to prevent liquids or gases from leaking from a closed system. The thread seals are usually made of hemp and sealing paste or Teflon and are wrapped around an external thread of the screw connection before screwing. When used correctly, the hemp fibers or Teflon, which is used in the form of thin strips, penetrates into the space between the external thread and the internal thread of the screw connection and seals this space against the passage of gases or liquids.

The application of hemp or Teflon tapes for sealing purposes is very time-consuming. In addition, even with the utmost care, subsequent leaks cannot be ruled out. For this reason, a connecting element whose external thread is coated with a polyamide layer has been proposed in the prior art.

Such thermoplastic sealants such as polyamide have a number of disadvantages, in particular the known sealants do not have any permanent elasticity. The known sealants therefore become brittle over time and gradually lose their sealant properties. Higher temperatures or even greater fluctuations in temperature, which alternately heat and cool the sealant, further favor the embrittlement of the sealant and thus the occurrence of leaks.

In addition to the disadvantageous hemp threads or hemp fibers or Teflon tapes, the application of plastic sealing elements such as PTFE to the external thread or the internal thread is also known. When the threaded elements are screwed together, the plastic seal ensures that the thread is sealed.

When sealing the threaded press-fit connectors mentioned above, there are also disadvantages in the connection structure caused by the spring-back properties of the material of the connected components and by temperature jumps after pressing. These effects lead to the formation of a gap within the thread and sealing system, which cannot be reliably bridged by the plastic seal.

As the plastic seal cannot compensate for the springing up of the fitting or movements in the connection, an elastomer seal could be used. Although the elastomer seal can prevent gaps from forming, there is a risk of damage at the sharp thread edges. It is therefore not possible to use elastomer seals to seal threaded connections.

Another problem with special fittings such as threaded press connectors is that they often have to be processed with a pressing tool that was designed for a different system. This means that the required pressing forces can be too high or the fitting can be pulled askew during processing. This problem occurs especially with wide fittings that have a very wide pressing contour and therefore do not guide the fitting sufficiently during forming. As a result, only inadequate pressing results are achieved.

Another requirement is to press a fitting that is rarely used and designed as a threaded press connector with the same tool, i.e. the same pressing machine and pressing jaw, as a frequently used press fitting without a thread of the same system. The challenge is therefore to adapt the threaded press connector to a tool that has previously been adapted and optimized for a specific press connector and pipe diameter. In doing so, a reduction in the pressing forces while maintaining high performance must be taken into account for a threaded press connector.

The present invention is therefore based on the technical problem of providing a fitting for producing a fluid-tight screw connection for a pipe having an external thread, in which the disadvantages known from the prior art do not occur or at least occur to a lesser extent.

The above technical problem is solved according to the invention by a fitting for creating a fluid-tight screw connection for a pipe having an external thread, with a fitting base body, with a pressing sleeve connected to the fitting base body, with a chamber formed in the pressing sleeve, with an elastomer seal arranged in the chamber and with a plastic seal arranged in the pressing sleeve, wherein the elastomer seal consists of a material having an elasticity greater than the elasticity of the material of the plastic seal, and wherein the plastic seal is in contact with the elastomer seal on the outside and has a thread on the inside for screwing onto the external thread of the pipe.

The strength of a solid plastic for the plastic seal and the elastic resilient properties of an elastomer for the elastomer seal are thus combined in an advantageous way. The plastic seal seals against the external thread of the pipe and is resistant to the sharp edges of the thread. The elastomer seal, on the other hand, seals the plastic seal against the pressing sleeve of the fitting. The elastomer seal therefore exerts pressure on the plastic seal in order to press the plastic seal firmly into the threads of the external thread of the pipe. The elastomer seal compensates for any springing of the material of the pressing sleeve.

The elastomer seal and the plastic seal are inserted into the pressing sleeve and are then sufficiently secured against twisting when screwed onto the thread of the pipe by static friction. After pressing, the seals allow a rotary movement without leakage occurring. The elastomer seal can compensate for material-related springback properties and sudden temperature fluctuations better than the plastic seal, whereas the plastic seal is more resistant to the sharp edges of the external thread.

In a preferred manner, a guide element is formed at the proximal end of the pressing sleeve, which guide element is spaced from the chamber and protrudes radially outwards. The guide element, for example, has the shape of an angled flange which is inclined towards the axis of the fitting in the direction of the chamber. The fitting therefore has an asymmetrical pressing contour that deforms asymmetrically when pressed with a symmetrical pressing contour. As described below, a geometry that folds over on one side can be created.

The radially outwardly protruding guide element preferably has a lower bending strength than the pressing sleeve of the fitting. This makes it easier for the guide element to deform in a targeted manner. For this purpose, the guide element may be designed as a thin metal web that has a thinner wall thickness than the rest of the fitting. Alternatively or additionally, the guide element may also be made of a material of lower strength than the pressing sleeve of the fitting, e.g. the guide element may be designed as a plastic element.

The deformability effect may be further improved by the guide element being inclined to the axis of the fitting base body, in particular at an angle to the axis of <75°. In addition to easier deformability, the direction of bending is thus predetermined.

In a preferred embodiment, the outside of the pressing sleeve at the distal end of the chamber has a diameter that corresponds to the outer diameter of the protruding guide element. This means that at the start of the pressing process, the two outer protruding elements of the fitting are in contact with the pressing contour. The subsequent application of the pressing force then leads to an asymmetrical forming of the fitting, as the guide element and the chamber each have their own geometry and react differently to the pressing force. The asymmetry relates in particular to the guide element and less or not at all to the asymmetrical chamber. This is because the chamber is largely being bent and less compressed. In addition, the inclined and therefore conical shape of the guide element enables the folding-over and strong circumferential reduction at the outer end of the chamber and thus the chambering of the O-ring resulting from the pressing.

Furthermore, it is preferable that the outside of the pressing sleeve at the distal end of the chamber has a diameter that is larger than the diameter at the proximal end. This ensures that the pressing force is introduced into the fitting at the distal end of the pressing sleeve. The distal end of the pressing sleeve is thus bent down by the pressing tool until both diameters mentioned are the same size. During further pressing, the chamber is compressed. The initial down-bending requires little pressing force and allows the radial distance between the stop and the outer contour of the external thread to be adjusted after pressing.

In the geometry of the pressing sleeve with guide element and chamber, at least one section may be formed with a reduced wall thickness and/or with a predetermined bend, so that this at least one section bends more than other sections of the pressing sleeve during pressing. It is therefore possible to speak of a folding-over at this at least one section, which characterizes the behavior of the pressing sleeve.

The force required to bend down the ferrule can be influenced by the angle that the wall of the proximal end of the chamber forms with the axis of the fitting base body. This angle is preferably <90°, preferably <70°, in order to favor the bending down of the pressing sleeve.

The guide element also ensures that the pressing jaw is positioned almost coaxially. The guide element is designed in such a way that as little force as possible is required to fold it over.

By folding-over the pressing sleeve, less material is formed with the same wall thickness and the fixation or chambering of the pressed sealing element is improved. The lesser material forming leads to a reduction in the required pressing force. The targeted folding-over around the sections that act as pivot points also reduces skewing and elongation of the pressing sleeve during pressing. Both the low pressing force and the prevention of elongation are primarily achieved by bending the chamber instead of compressing it.

When the pressing sleeve is folded over, the elastomer seal, which elastomer seal for example is designed as an O-ring, which elastomer seal for example consists of ethylene-propylene-diene (monomer) rubber (EPDM), is pressed against the plastic seal, the plastic seal for example consisting of polytetrafluoroethylene (PTFE), so that the plastic seal is pressed with the internal thread against the external thread of the pipe. The pressed plastic seal adapts to any unevenness of the external thread and seals the connection against the external thread. Due to its greater elasticity, the elastomer seal makes it possible to maintain the contact pressure required for sealing. The elastomer seal and the plastic seal are fixed in the chamber when pressed to prevent axial separation of the two seals. The improved fixation enables higher system pressures without increasing the risk of the connection between fitting and pipe slipping apart.

In a preferred manner, a conically shaped stop for the plastic seal is formed on the inside of the proximal end of the pressing sleeve. This secures the plastic seal in the axial direction, particularly during screwing onto the tube.

Furthermore, the plastic seal may have an extension for abutment against the stop of the pressing sleeve, the extension adjoining the internal thread at the proximal end. This extension allows the threaded section of the plastic seal to be arranged in the distal direction in such a way that galvanic separation between the external thread of the pipe and the fitting base body can be achieved and ensured.

In an alternative embodiment, the plastic seal may be shorter in the axial direction than the external thread of the tube. If an internal thread is also formed on the inside of the pressing sleeve, the external thread can be screwed to both the plastic seal and the internal thread of the pressing sleeve. The connection strength function and the sealing function may also be at least partially decoupled in order to significantly increase the connection strength by means of a section with engaging metal threads or to be able to seal better by means of a soft plastic of the plastic seal. The electrical insulation described above cannot be realized in this case.

In a further preferred embodiment of the fitting, an axial stop for the plastic seal is formed at the distal end of the pressing sleeve. This prevents the plastic seal from moving in an axial direction at the distal end.

Furthermore, a recess, preferably circumferential recess, may be formed on the outside of the plastic seal to partially accommodate the elastomer seal. As a result, the relative position of the two seals to each other is predetermined and at least partially secured before pressing.

BRIEF DESCRIPTION OF THE DRAWINGS

In the following, the invention is explained with reference to the drawing by means of exemplary embodiments. In the drawing

DESCRIPTION OF THE INVENTION

Figure 1:
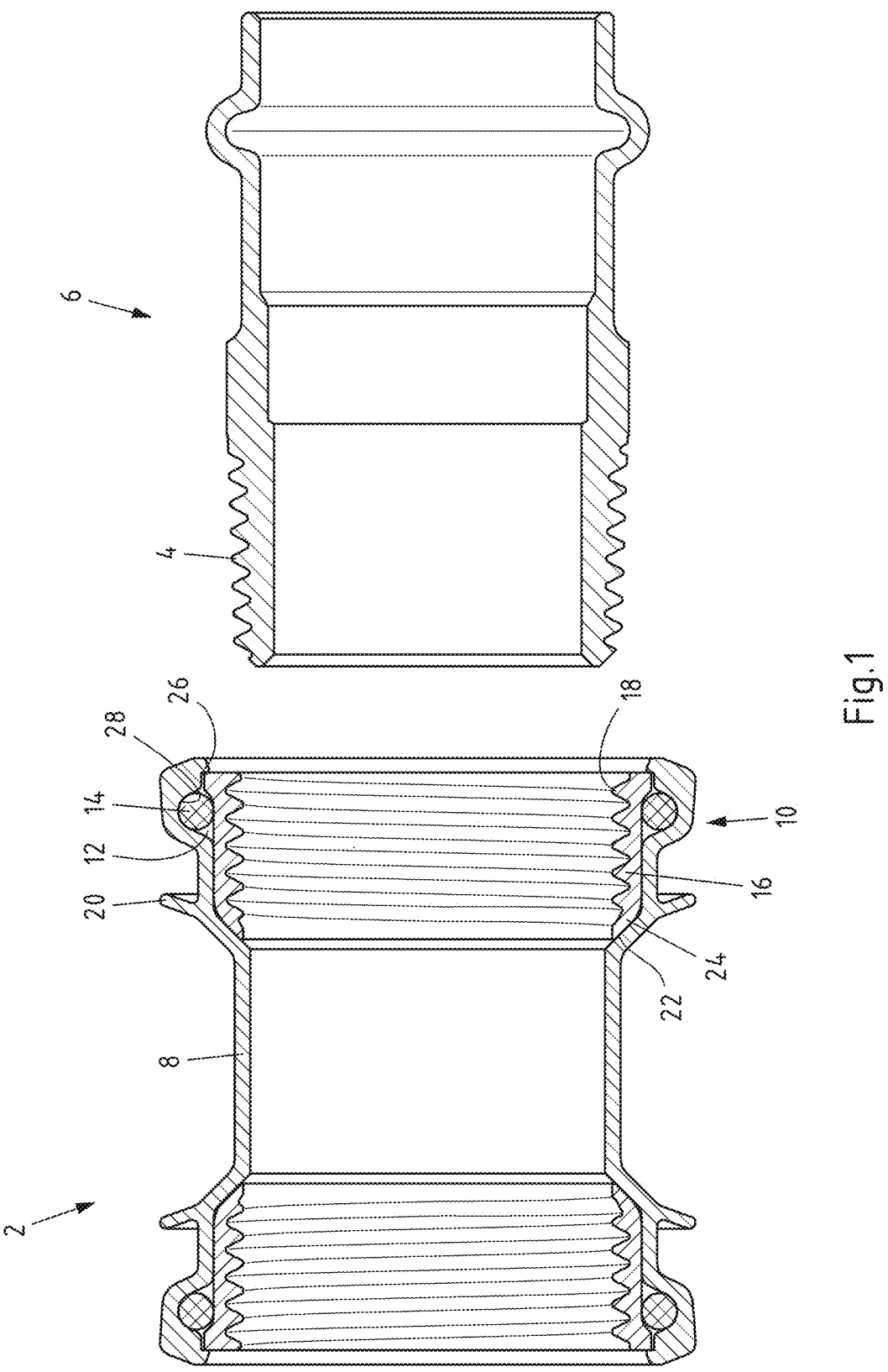
FIG. 1 shows a fitting according to the invention with a pipe to be connected before screwing on in a sectional view.

FIGS. 1 to 7 show a fitting 2 for creating a fluid-tight screw connection for a pipe 6 having an external thread 4. The pipe 6 may be part of another fitting, a connection piece on a container or a connecting pipe to a further faucet.

The fitting 2 has a fitting base body 8 and a pressing sleeve 10 connected to the fitting base body 8. The pressing sleeve 10 has a chamber 12 formed therein, in which chamber an elastomer seal 14 is arranged. Furthermore, a plastic seal 16 is arranged in the pressing sleeve 10.

The elastomer seal 14 consists of a material having an elasticity that is greater than the elasticity of the material of the plastic seal 16. For example, the elastomer seal 14 may consist of ethylene-propylene-diene (monomer) rubber (EPDM) and the plastic seal 16 may consist of polytetrafluoroethylene (PTFE), polyethylene (PE), polypropylene (PP), polyphenylsulphone (PPSU), polyvinylidene fluoride (PVDF), polybutene (PB) elastomer seal: acrylonitrile-butadiene rubber (NBR) or fluoro rubber (FKM).

The plastic seal 16 is in contact with the elastomer seal 14 on the outside and has a thread 18 on the inside for screwing onto the external thread 4 of the pipe 6.

Figure 2:
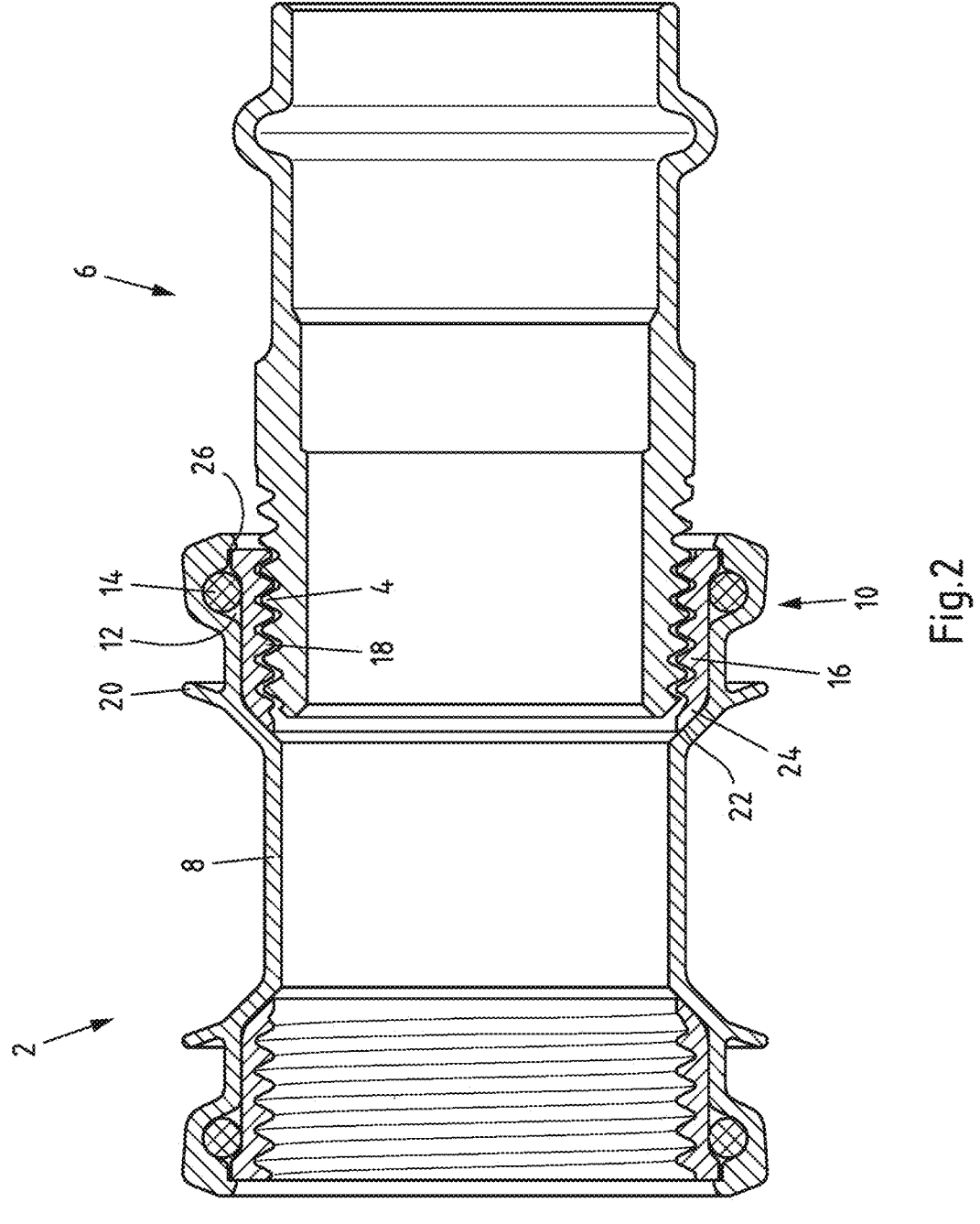
FIG. 2 shows the fitting from FIG. 1 after screwing on in a sectional view.
Figure 3:
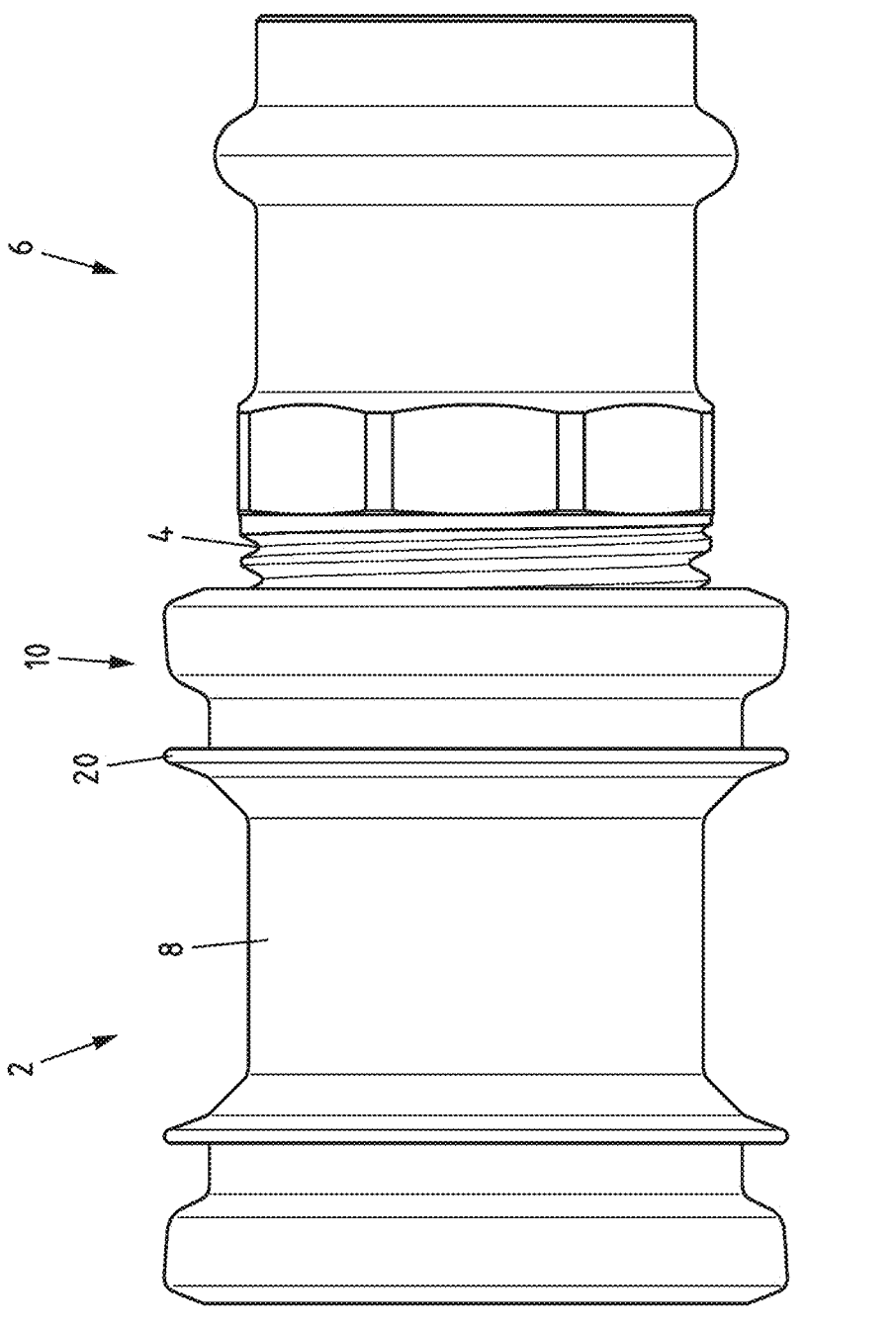
FIG. 3 shows a side view of the fitting from FIG. 2.

FIG. 1 shows the fitting 2 separated from the pipe 6, while FIGS. 2 and 3 show the fitting 2 screwed onto the pipe 6.

As can be seen from the figures, a guide element 20 in the form of an angled flange, which guide element is spaced from the chamber 12 and protrudes radially outwards, is formed at the proximal end of the pressing sleeve 10. The guide element 20 essentially serves to ensure that—as will be described below—a pressing jaw of a pressing tool can be applied more easily and more precisely.

At the distal end of the chamber 12, the outside of the pressing sleeve 10 has a diameter that corresponds to the outer diameter of the protruding guide element 20. Overall, this results in an asymmetrical contour of the pressing sleeve 10.

Furthermore, a conically shaped stop 22 for the plastic seal 16 is formed on the inside of the proximal end of the pressing sleeve 10. In addition, the plastic seal 16 has an extension 24 for abutment against the stop 22 of the pressing sleeve 10, the extension adjoining the internal thread 18 at the proximal end. As a result, the fitting base body 8 is galvanically separated from the pipe 6 even when the pipe 6 is screwed in.

Furthermore, an axial stop 26 for the plastic seal 16 is formed at the distal end of the pressing sleeve 10. This secures the plastic seal 16 axially.

A circumferential recess 28 for partially receiving the elastomer seal 14 is formed on the outside of the plastic seal 16, whereby the axial positions of the elastomer seal 14 and the plastic seal 16 are secured relative to each other. The seal may also be designed in such a way that an additional collar is provided, which primarily ensures the pull-out strength and may vary depending on the nominal width.

Figure 4:
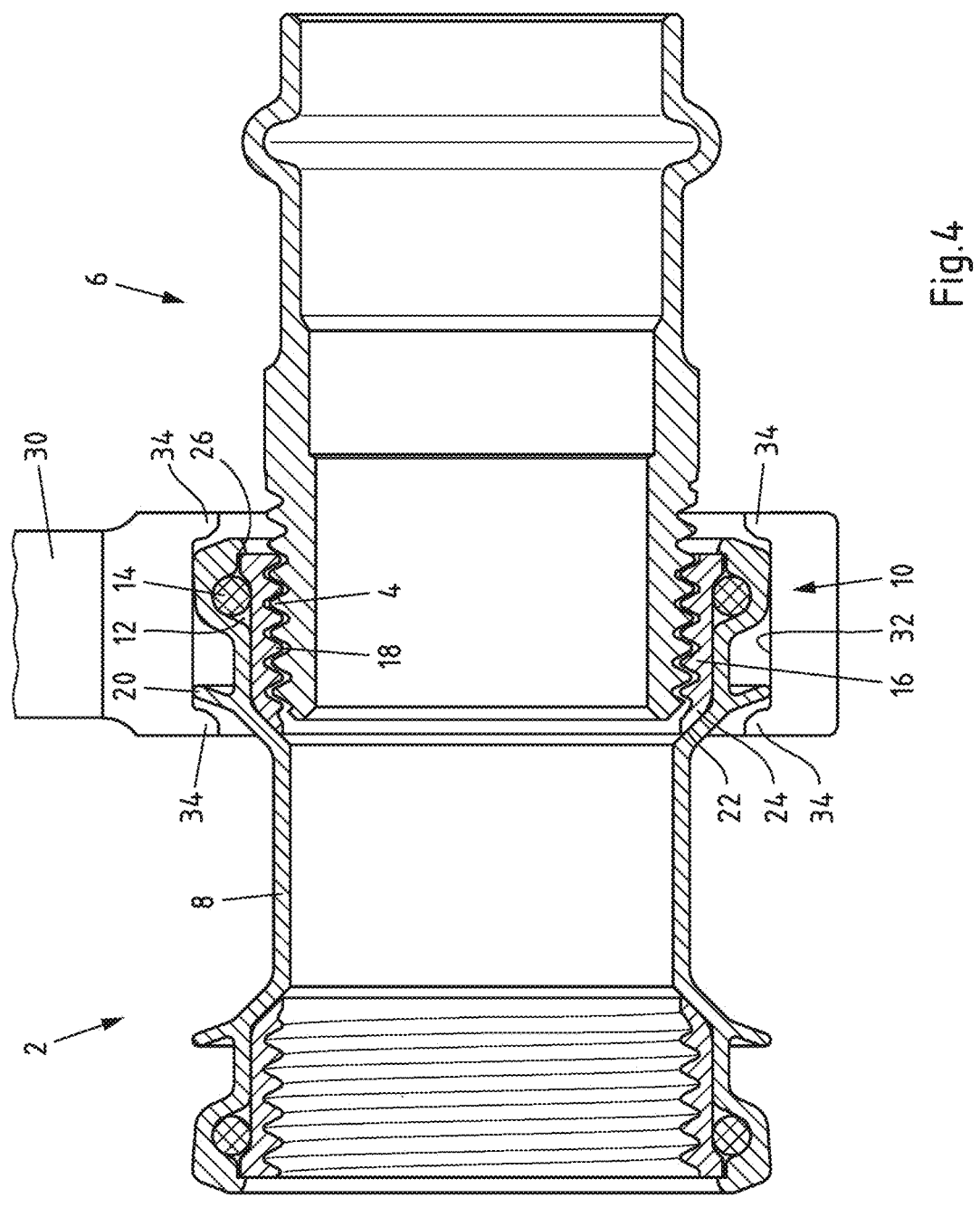
FIG. 4 shows the fitting from FIG. 2 with the press jaw attached in a sectional view.
Figure 5B:
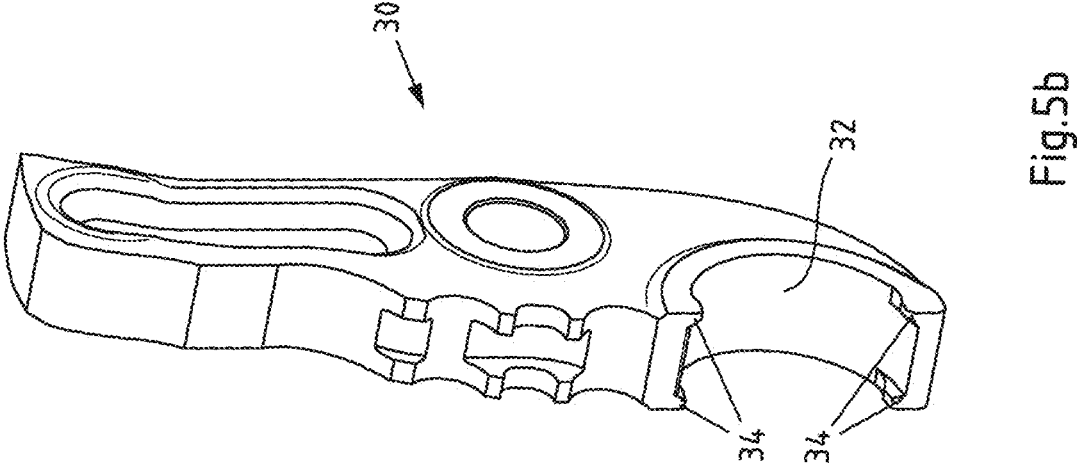
FIG. 5a, 5b show the fitting from FIG. 4 with one half of the pressing jaw in perspective view.
Figure 5A:
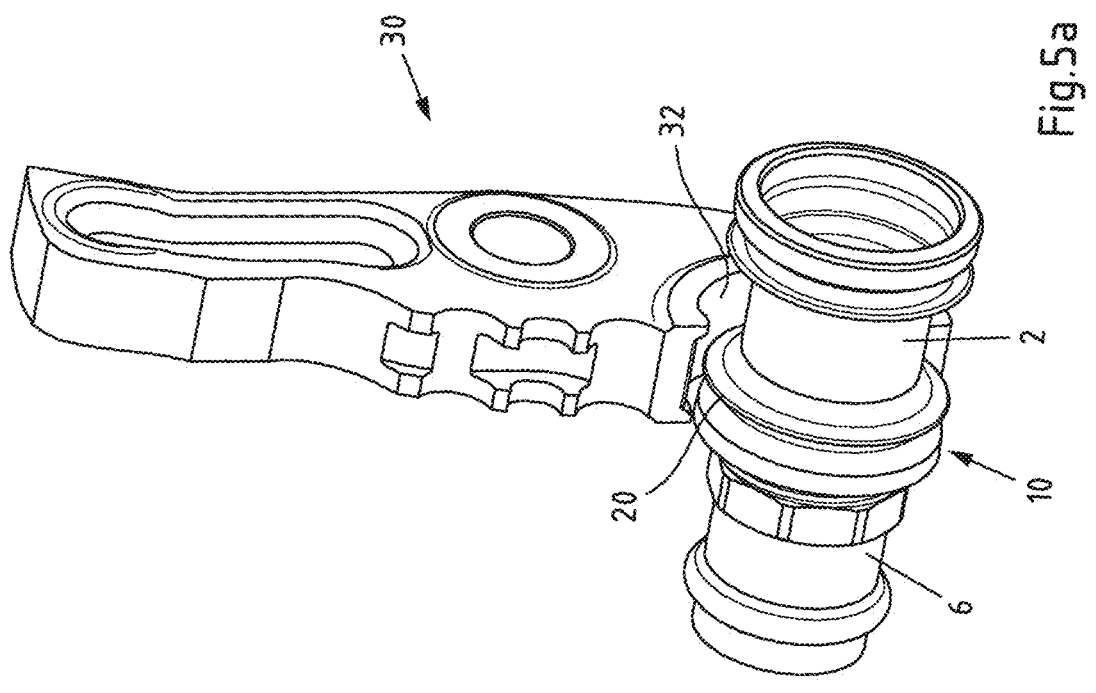

FIG. 4 shows the fitting 2 with screwed-in pipe 6 in the unpressed state and with the pressing jaw 30 attached, which pressing jaw has an essentially cylindrical pressing contour 32. Only at two positions of the circumferential pressing contour 32, radially inwardly protruding sections 34 are formed, which engage with the pressing sleeve 10 outside the chamber 12 and the guide element 20. These are also shown in FIGS. 5a and 5b.

The protruding sections 34, also known as guide cams, result in a lower pressing force than a circumferential guide web, which would also guide the fitting during forming.

Figure 6:
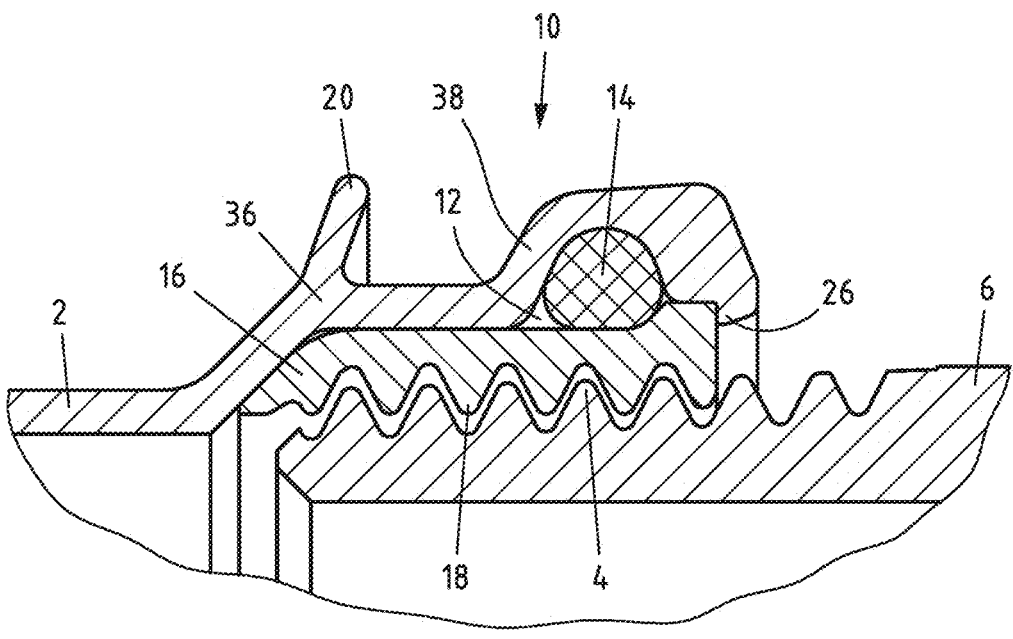
FIG. 6 shows the fitting from FIG. 2 before pressing in a schematic sectional view.
Figure 7:
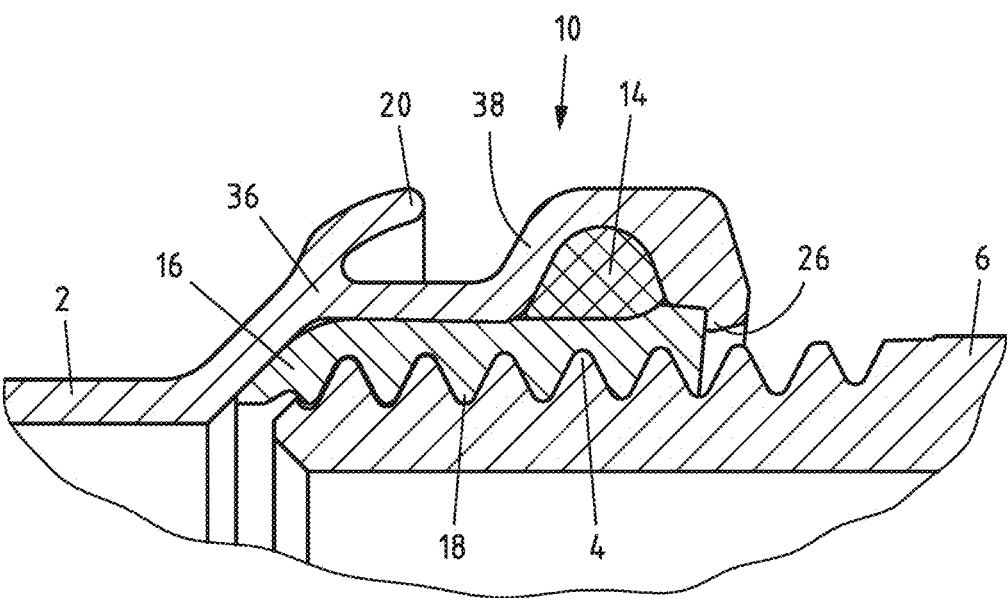
FIG. 7 shows the fitting from FIG. 6 after pressing and FIG. 8-11 show schematic representations of the fitting according to FIG. 2 with various sizes drawn in to characterize the fitting.

FIGS. 6 and 7 show the fitting 2 before and after pressing by means of a schematic representation that essentially corresponds to the geometry of the embodiment shown in FIGS. 1 to 5b.

The cylindrical pressing contour 32 deforms the pressing sleeve 10 during the radially inward pressing process, i.e. the distal end of the chamber 12 and the guide element 20, which primarily causes the pressing sleeve 10 to bend in the area of the two sections 36 and 38. This bending is also referred to as folding over in the context of this specification. This means that the pressing sleeve 10 has a geometry that folds over on one side. In addition, the guide element 20 bends inwards.

By the folding-over of the pressing sleeve, on the one hand, the elastomer seal 14 is pressed firmly against the plastic seal 16 by the chamber 12 being radially formed inwards, and, on the other hand, the distal end of the plastic seal 16 is pressed onto the pipe 6. This creates a section several threads long of the threads 4 and 18, along which the plastic seal 16 is sealingly connected to the pipe 6.

The pressing forces and degree of forming can be specifically adjusted using the one-sided folding-over geometry of the pressing sleeve 10. By reducing the size of the area of the pressing sleeve 10 to be formed, the pressing forces are reduced and wall thicknesses can still be maintained.

Fitting 2 for example consists of silicon bronze, but may be made of any other metal or alloy. Fitting 2 is screwed onto an external thread in accordance with DIN EN 10226 or ISO 228 and then pressed.

FIGS. 8 to 11 show the fitting 2 with different sizes to characterize the geometry.

Figure 8:
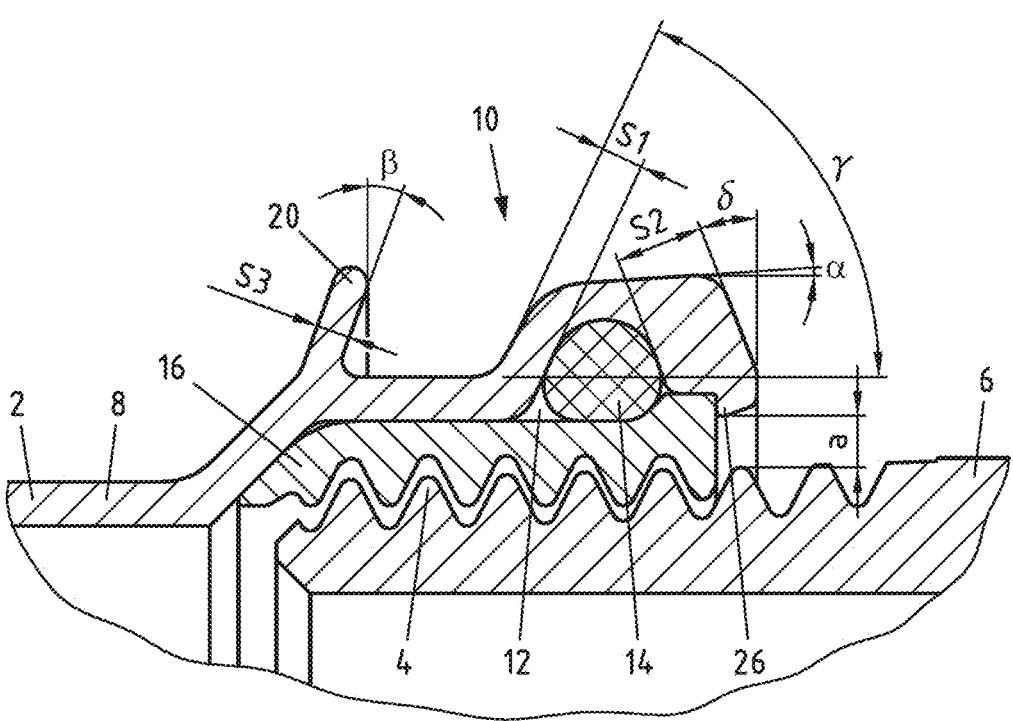

FIG. 8 shows the angle $\beta$ that the outside of the guide element 20 forms relative to the axis of the fitting base body 8. The angle $\beta$ influences the deformability of the guide element 20. The deformability can be improved by the guide element being inclined to the axis of the fitting base body, in particular by having an angle β to the axis of <75°. In addition to easier deformability, the direction of bending is thus predetermined.

The radially outwardly protruding guide element 20 therefore has a lower bending load capacity than the pressing sleeve 10 of the fitting 2. This makes it easier for the guide element 20 to deform in a targeted manner. For this purpose, the guide element 20 can be designed as a thin metal web, which has a lower wall thickness S3 than the rest of the fitting 2 with the wall thickness S1 of the proximal end of the chamber 12 and than the wall thickness S2 of the distal end of the chamber 12.

Alternatively or additionally, the guide element 20 may also be made of a material of lower strength than the pressing sleeve 10 of the fitting 2, e.g. the guide element 20 may be designed as a plastic element.

Figure 9:
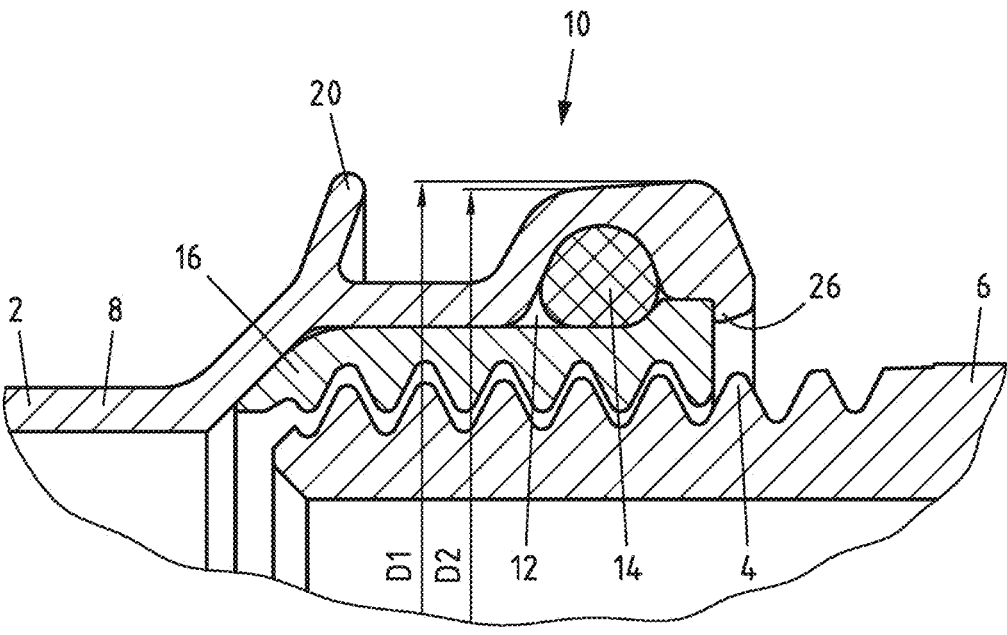
Figure 10:
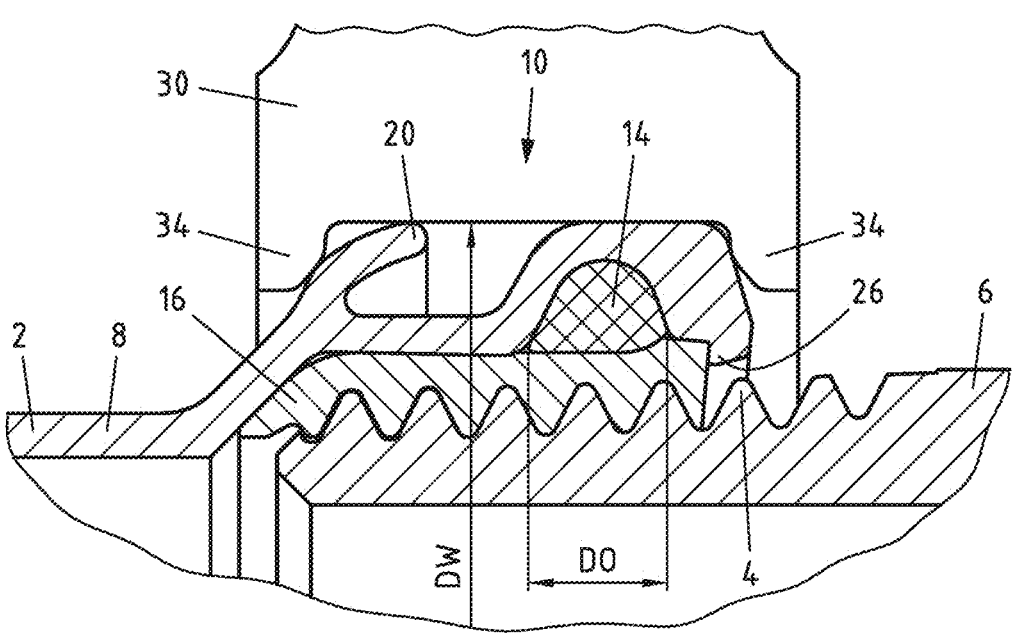

As FIG. 9 shows, the outside of the pressing sleeve at the distal end of the chamber has a diameter D1 that is larger than the diameter D2 at the proximal end. This ensures that the pressing force is introduced into the fitting 2 at the distal end of the pressing sleeve 10. The distal end of the pressing sleeve 10 is thus bent down by the pressing tool 30 until both diameters D1 and D2 are the same size. During further pressing, the chamber 12 is compressed. The initial bending down requires little pressing force and allows the radial distance a, shown in FIG. 8, of the stop 26 to the outer contour of the external thread 4 to be set in a targeted manner after pressing.

Figure 11:
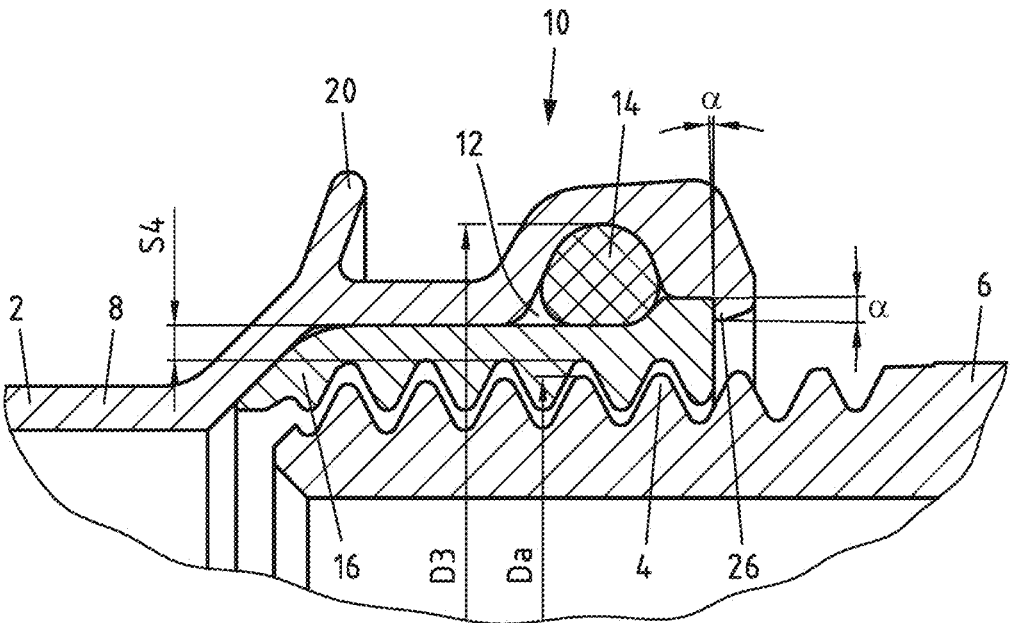

The further the distance a is reduced by pressing, the better the plastic seal 16 is enclosed behind it. The bending down of the stop 26 is determined by the ratio of the diameter D1 to the angle α, which is shown in FIG. 8, or to the diameter D2. The angle α may be repeated in the stop 26 at the distal end of the pressing sleeve 10, as FIG. 11 shows, so that the internal geometry of the pressing sleeve 10 and the external geometry of the plastic seal 16 are designed to correspond in the pressed state.

The distance a is equal to the difference between the diameter 1 and the diameter DW of the tool contour. The reduction of the distance a is therefore calculated approximately using the formula shown below, whereby the variables used are shown in FIGS. 8 to 11. The reduction of the distance a should be greater than 1 mm.

$$a = \frac{D1 - DW}{2} > 1 \text{ mm}$$

The reduction of the distance a should be as large as possible, but the compression K of the elastomer seal 14 and the plastic seal 16 must not become so large that damage occurs. The compression K should be between 10% and 50%, preferably between 20% and 30%, in relation to the initial geometry and is calculated using the formula shown below. The angle α can be used to ensure that the elastomer seal 14 and the plastic seal 16 are not overstressed if the distance a is reduced sufficiently.

$$K = \frac{(S4 + DO) - \left( \frac{(D3 - Da) - (D2 - DW)}{2} \right)}{S4 + D0}$$

The compression K is calculated by subtracting the height of the compressed sealing chamber $$\left( \frac{(D3 - Da) - (D2 - DW)}{2} \right)$$

from the sum of the O-ring cross section diameter and the seal thickness (s4+DO) and setting the result in relation to the initial total seal thickness (s4+DO). The height of the chamber 12 is calculated by taking the difference between the inside diameter D3 of the chamber 12 and the outside diameter Da of the external thread 4, (D3/2–Da/2). The distance that the pressing tool 30 compresses the chamber 12, (D2/2–DW/2), is then subtracted from the height of the sealing chamber in order to obtain the measure for the height of the pressed chamber 12.

If insulation of the pressing sleeve 10 to the external thread 4 is to be ensured, the following applies. The distance between the inside diameter of the stop 26 at the distal end of the pressing sleeve 10 and the external thread 4 must be greater than the pressing path p1 that the pressing jaw 30 compresses the pressing sleeve 10 so that there is no contact between the external thread 4 and the pressing sleeve 10 of the fitting 2 after pressing. This means that the distance a after pressing is a>0. The pressing path p1 is determined as the difference between the dimension of the diameter D1 before pressing, shown in FIG. 9, and the dimension of the tool diameter DW after pressing, shown in FIG. 10.

Furthermore, FIG. 8 shows an angle γ that the wall of the proximal end of the chamber 12 forms with the axis of the fitting base body 8. The force required to bend down the pressing sleeve 10 can be influenced by the angle γ. This angle γ is preferably <90°, preferably <70°, in order to favor the bending down of the pressing sleeve 10.

The invention claimed is:

1. A fitting for creating a fluid-tight screw connection for a pipe having an external thread, the fitting comprising:
   a fitting base body,
   a pressing sleeve connected to the fitting base body,
   a chamber formed in the pressing sleeve,
   an elastomer seal arranged in the chamber and
   a plastic seal arranged in the pressing sleeve,
   wherein the elastomer seal consists of a material having an elasticity greater than the elasticity of the material of the plastic seal, and
   wherein the plastic seal is in contact with the elastomer seal on an outside and has a thread on an inside for screwing onto the external thread of the pipe.

2. The fitting according to claim 1, wherein a guide element spaced from the chamber and protruding radially outwards is formed at a proximal end of the pressing sleeve.

3. The fitting according to claim 1, wherein the outside of the pressing sleeve at a distal end of the chamber has a diameter which corresponds to an outer diameter of the protruding guide element.

4. The fitting according to claim 1, wherein a conically shaped stop for the plastic seal is formed on the inside of the proximal end of the pressing sleeve.

5. The fitting according to claim 4, wherein the plastic seal has an extension for abutment against the stop of the pressing sleeve, the extension adjoining the internal thread at the proximal end.

6. The fitting according to claim 1, wherein an axial stop for the plastic seal is formed at the distal end of the pressing sleeve.

7. The fitting according to claim 1, wherein on the outside of the plastic seal, a recess for partially receiving the elastomer seal is formed.

8. The fitting according to claim 7, wherein the recess is a circumferential recess.

* * * * *